Figure 1:
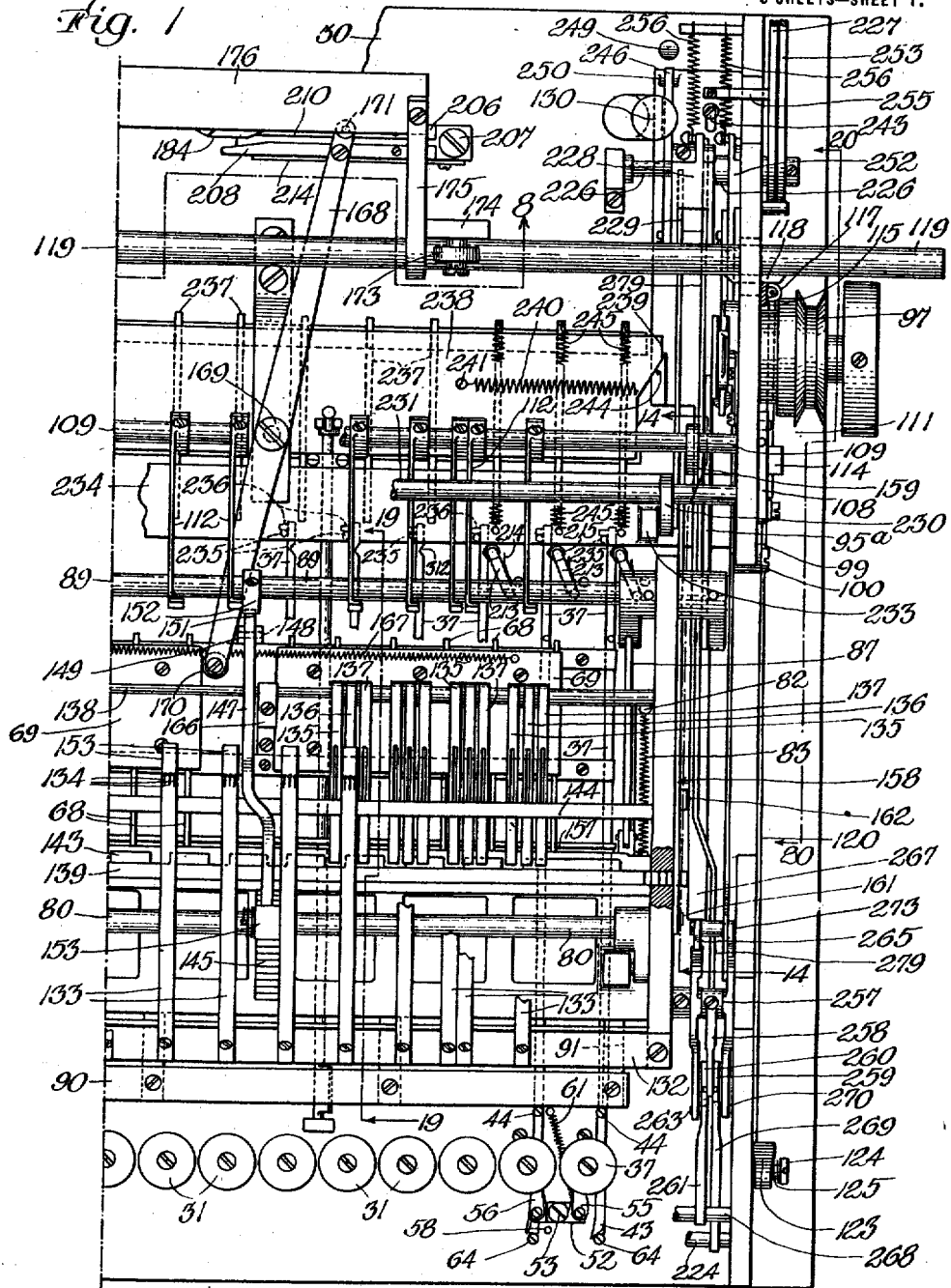

E. H. PALMER & W. S. KINSLEY.
E. M. & H. V. PALMER & W. H. ROBERTS, EXECUTORS OF E. H. PALMER, DEC'D.
CALCULATING MACHINE.
APPLICATION FILED AUG. 2, 1912.

1,212,248.

Patented Jan. 16, 1917.
8 SHEETS—SHEET 1.

Witnesses:
D. L. Clark
G. L. Johnson

Inventors:
Edward H. Palmer,
William S. Kinsley,
by Wright, Brown, Quinby & May
Attorneys.

E. H. PALMER & W. S. KINSLEY.
E. M. & H. V. PALMER & W. H. ROBERTS, EXECUTORS OF E. H. PALMER, DEC'D.
CALCULATING MACHINE.
APPLICATION FILED AUG. 2, 1912.

1,212,248.

Patented Jan. 16, 1917.
8 SHEETS—SHEET 2.

Witnesses:
D. L. Clark
G. L. Johnson

Inventors
Edward H. Palmer,
William S. Kinsley,
by Wright, Brown, ...
Attorneys

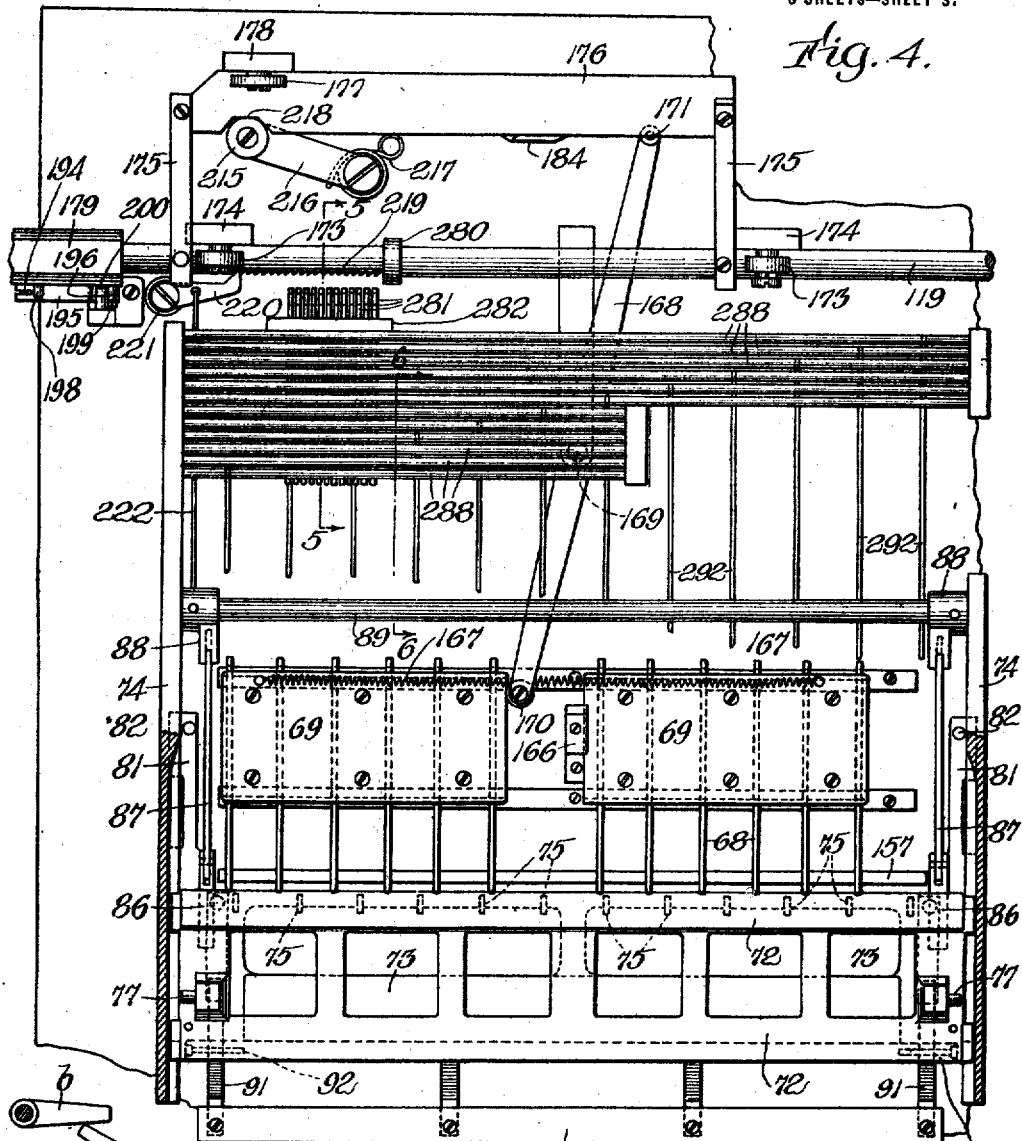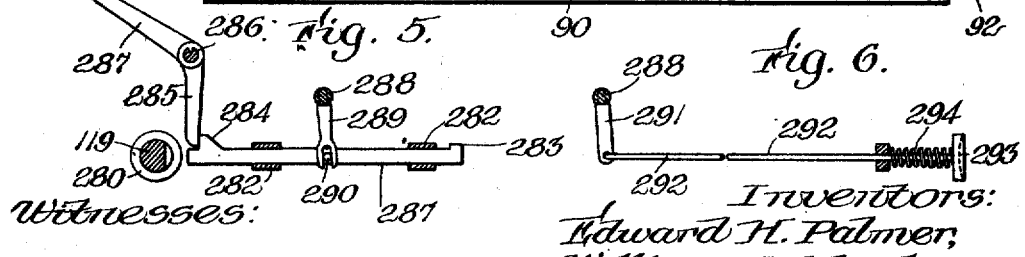

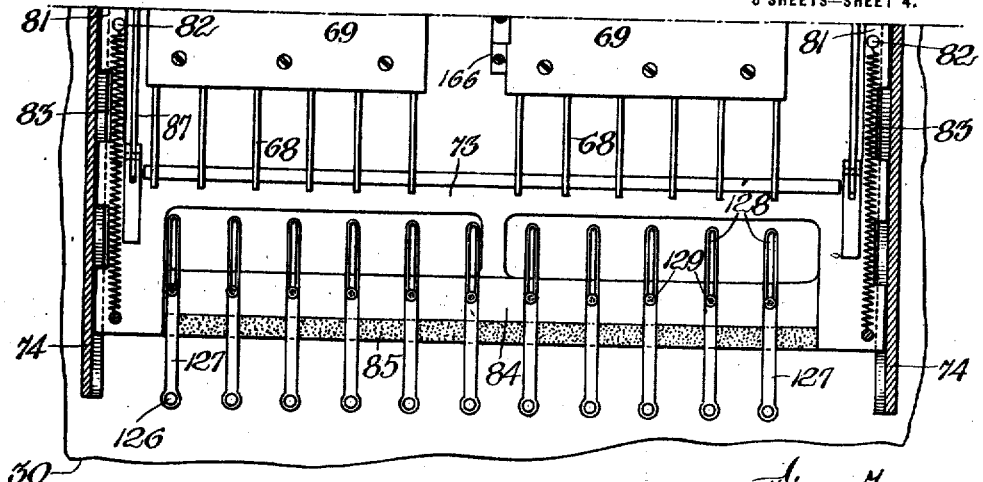
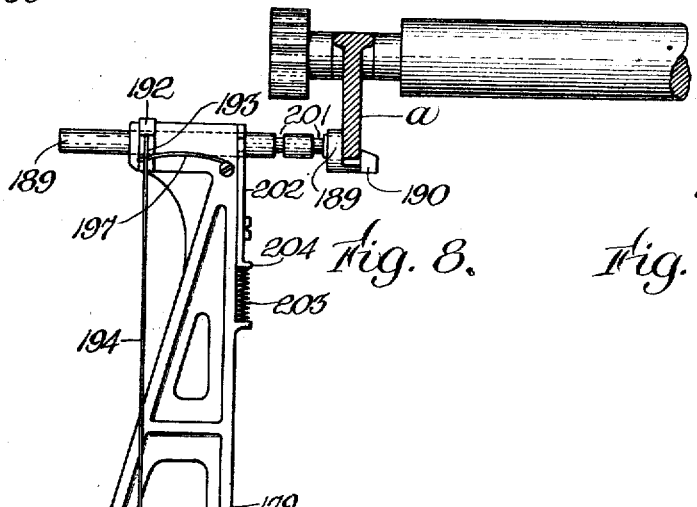
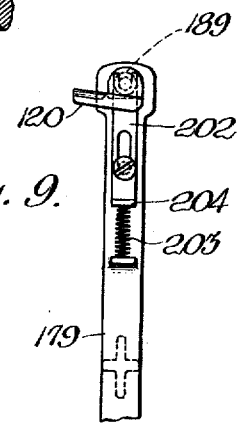
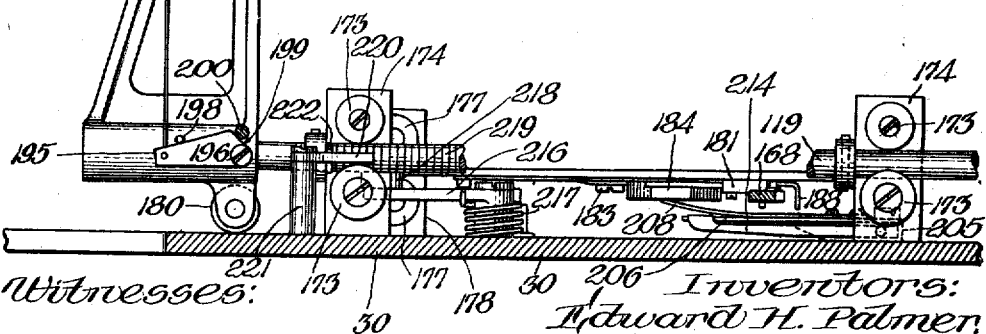

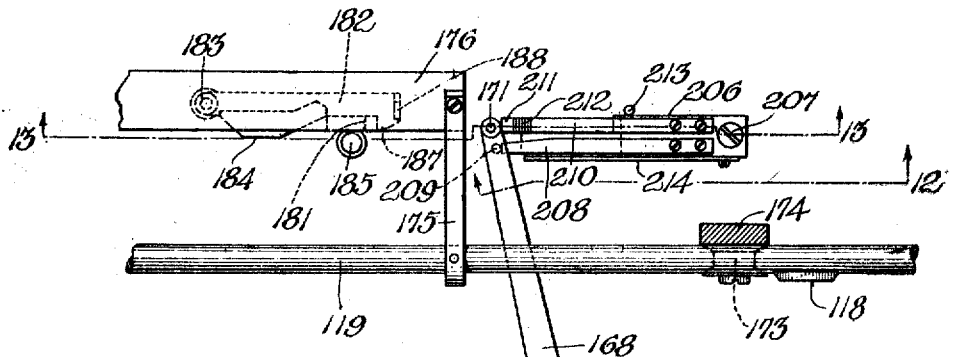
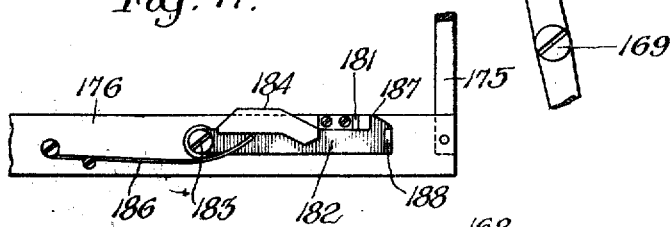
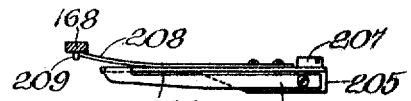
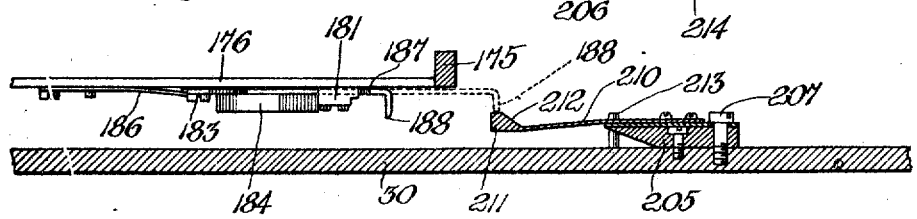
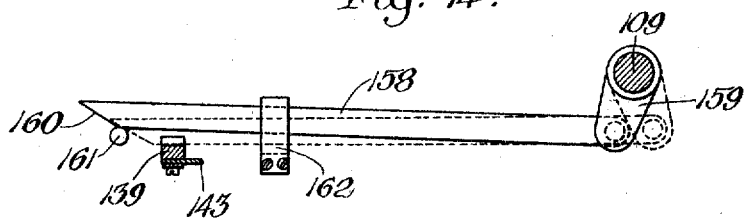

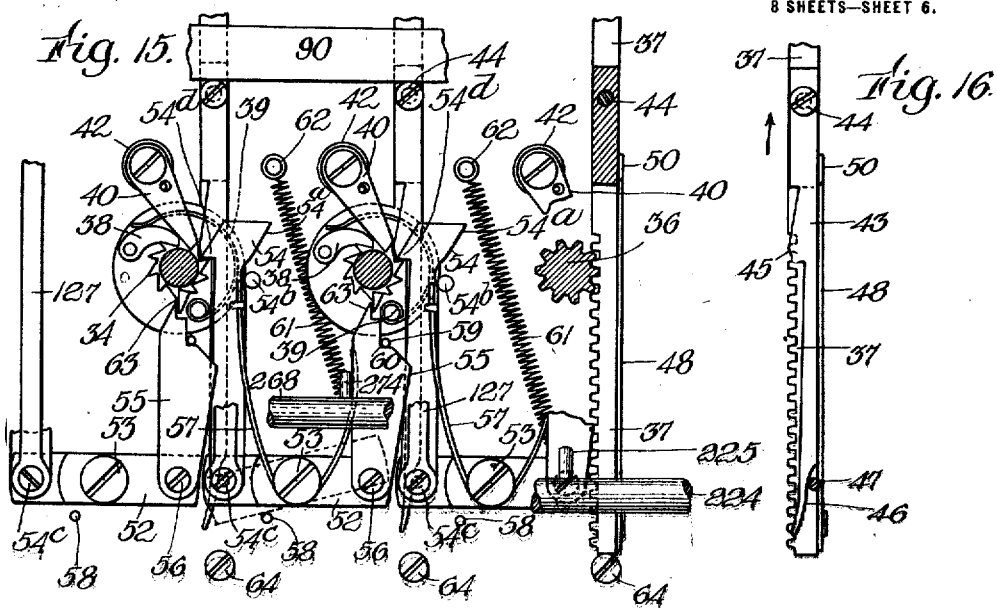
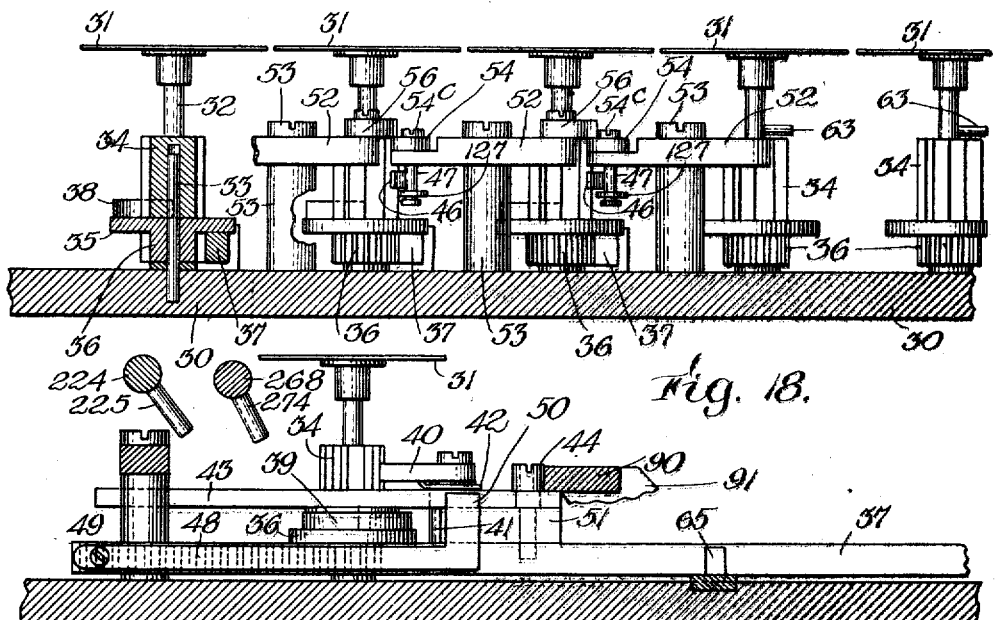

E. H. PALMER & W. S. KINSLEY.
E. M. & H. V. PALMER & W. H. ROBERTS, EXECUTORS OF E. H. PALMER, DEC'D.
CALCULATING MACHINE.
APPLICATION FILED AUG. 2, 1912.
1,212,248.
Patented Jan. 16, 1917.
8 SHEETS—SHEET 7.
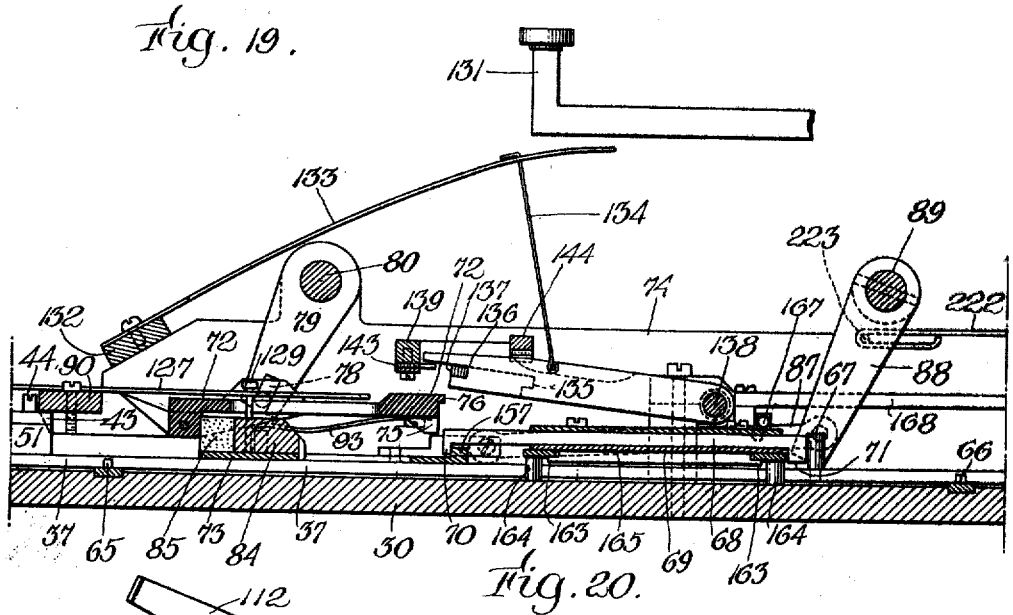
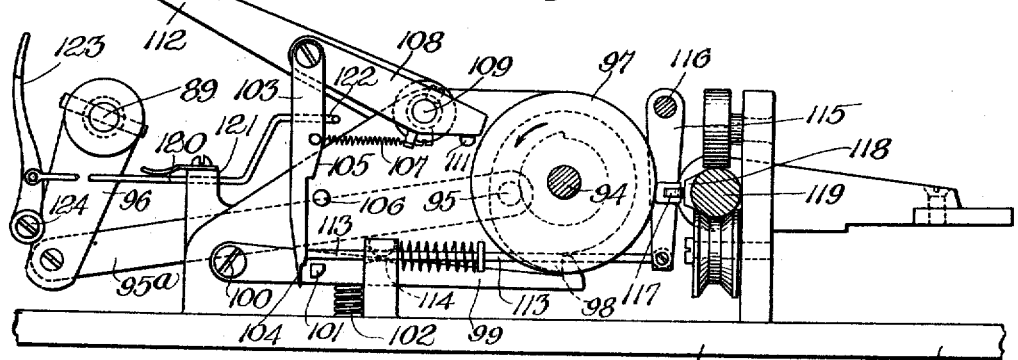
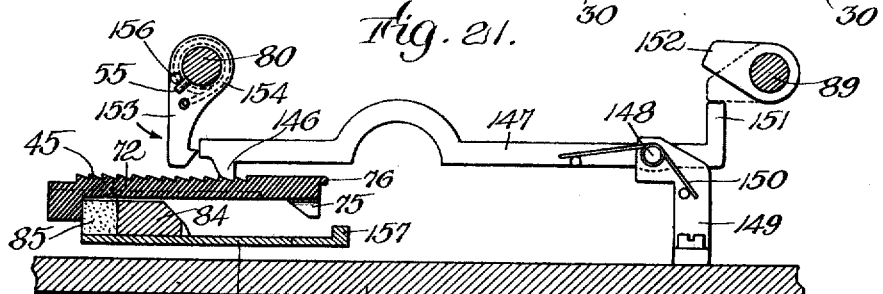

E. H. PALMER & W. S. KINSLEY.
E. M. & H. V. PALMER & W. H. ROBERTS, EXECUTORS OF E. H. PALMER, DEC'D.
CALCULATING MACHINE.
APPLICATION FILED AUG. 2, 1912.
1,212,248.
Patented Jan. 16, 1917.
8 SHEETS—SHEET 8.
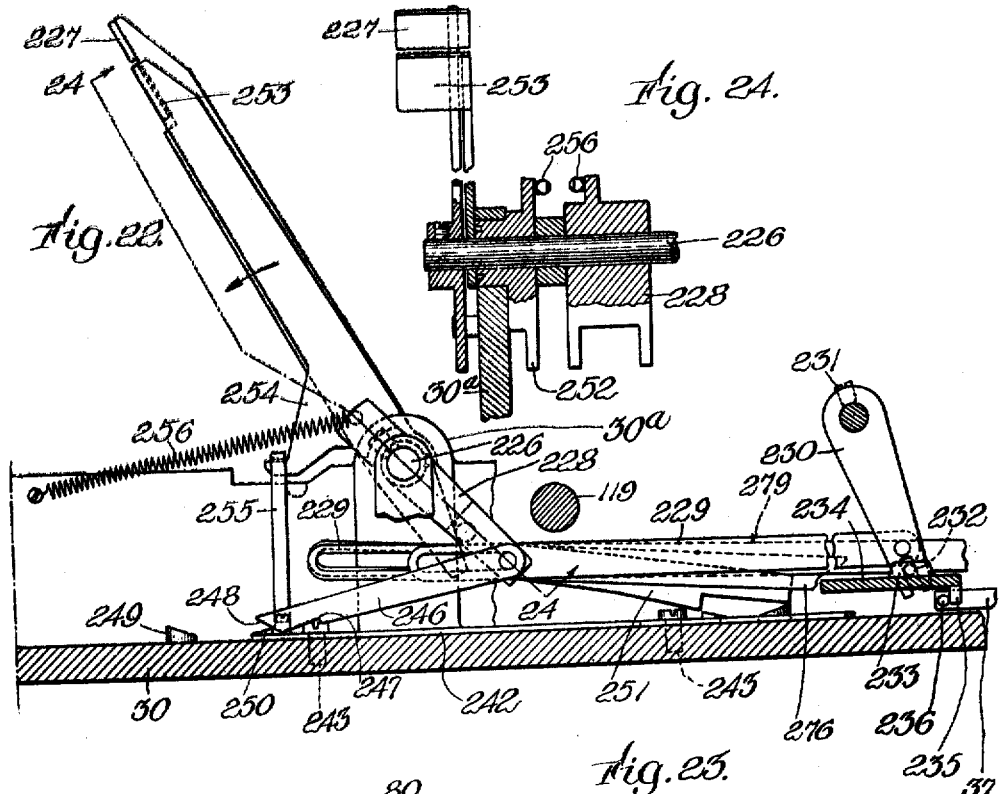
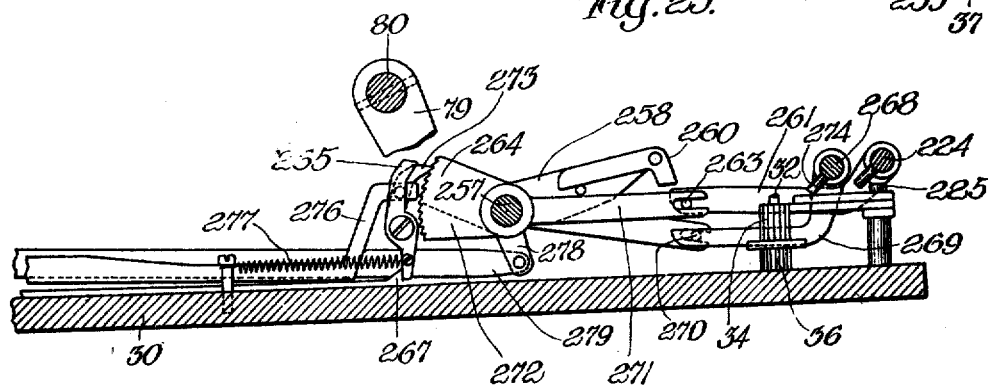
Witnesses:
D. L. Clark
G. L. Johnson
Inventors:
Edward H. Palmer,
William S. Kinsley,
by Wright, Brown, Quinby & May
Attorneys

UNITED STATES PATENT OFFICE.

EDWARD H. PALMER AND WILLIAM S. KINSLEY, OF READING, MASSACHUSETTS; SAID KINSLEY ASSIGNOR TO SAID PALMER; EMILY M. PALMER AND HAROLD V. PALMER, BOTH OF READING, MASSACHUSETTS, AND WALTER H. ROBERTS, OF MALDEN, MASSACHUSETTS, EXECUTORS OF SAID EDWARD H. PALMER, DECEASED; SAID EXECUTORS ASSIGNORS TO EMILY M. PALMER AND HAROLD V. PALMER, INDIVIDUALLY.

CALCULATING-MACHINE.

1,212,248.      Specification of Letters Patent.      Patented Jan. 16, 1917.

Application filed August 2, 1912. Serial No. 712,872.

*To all whom it may concern:*

Be it known that we, EDWARD H. PALMER and WILLIAM S. KINSLEY, citizens of the United States, and residents of Reading, in the county of Middlesex and State of Massachusetts, have invented certain new and useful Improvements in Calculating-Machines, of which the following is a specification.

This invention relates to calculating apparatus especially adapted for operation simultaneously with a typewriting machine under the control of the latter, for indicating totals of figures which are being written on a sheet by a typewriting machine.

The present invention has particular reference to improvements upon the type of apparatus shown in our application filed December 18, 1909, Serial No. 533,443.

The especial objects of the present invention are to provide improved means whereby the calculating apparatus may be operated by power or in other words to connect power up to the calculating mechanism whenever a numeral key of the typewriting machine is actuated. It may be stated here, however, that with very slight changes the calculating mechanism may be operated solely by power obtained through manual actuation of the said numeral keys.

A further object is to provide means whereby the operative combination between the typewriting machine and the calculating apparatus may be effected without making any positive connections between the two.

A further object of the present invention is to provide an improved compound carriage for effecting the actuation of the reciprocating slides which transmit motion to the counters.

A further object is to provide an improved selector mechanism for connecting the counter that is to be actuated according to the position of the typewriter carriage, with any numeral key that is to be used.

A further object is to provide means for preventing any step movement of the typewriter carriage until the actuation of the counter has been completed.

A further object is to provide improved mechanism for intermittently connecting the typewriter carriage with the selecting mechanism.

Another object is to provide improved control mechanism relating to the connections for determining the actuation of a counter by the power mechanism when said power mechanism is permitted to operate by the movement of a typewriter numeral key lever.

A further object of the invention is to provide improved combination spindles for the counters.

A further object is to provide a calculating mechanism with tabulating devices which are entirely separate from or independent of the typewriting machine, but which will locate on the sheet the columns of figures that are being written and added or subtracted.

Another object is to provide an improved carrying-resetting mechanism.

Further objects are to provide improvements which will be hereinafter described.

Figure 4:
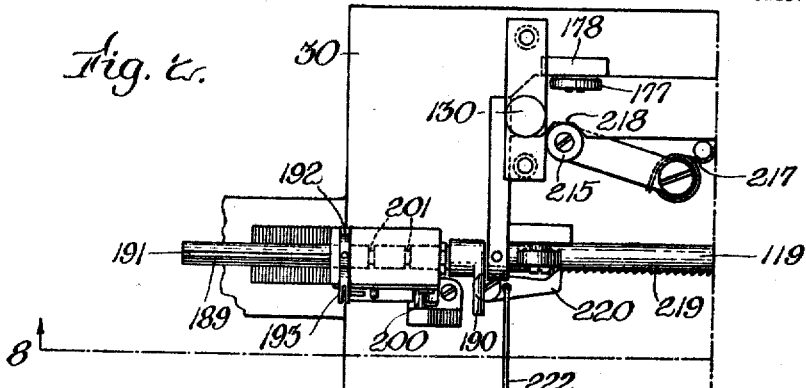
Figure 5:
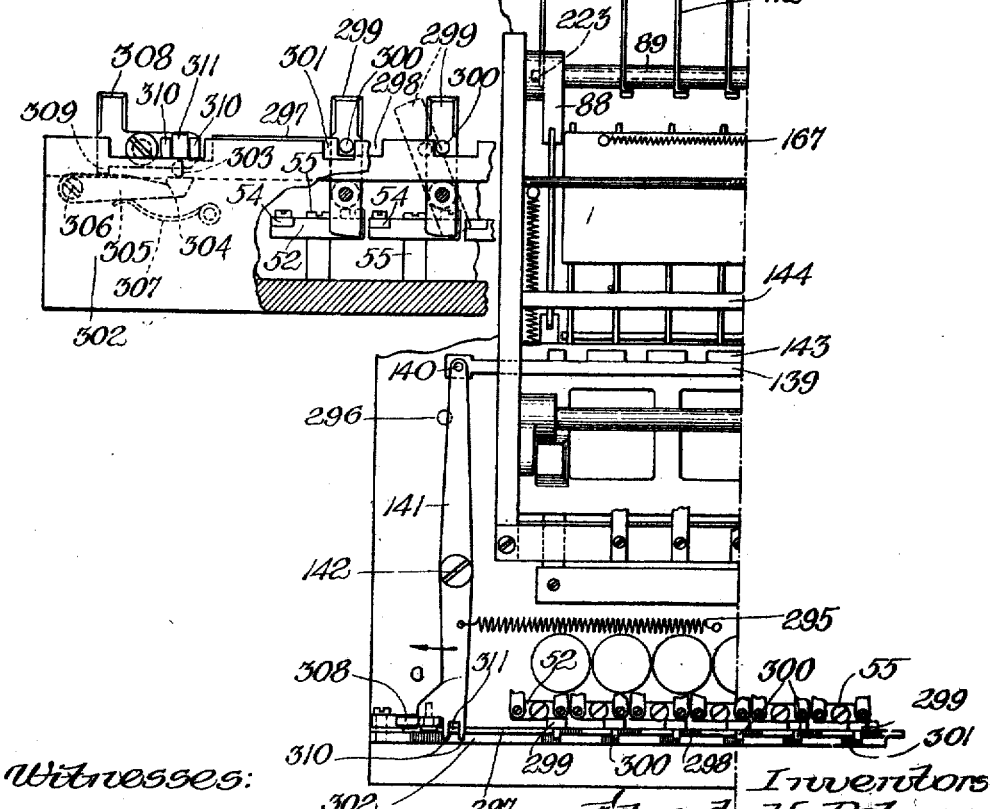

Of the accompanying drawings: Figure 1 is a plan view of the right-hand portion of the calculating apparatus above which the typewriting machine is to be placed, the tabulating mechanism being omitted; Fig. 2 is a similar view of the left-hand portion of the apparatus, partly broken out; Figs. 1 and 2 together present a plan view of the complete apparatus; Fig. 3 is a front elevation of parts of the subtraction mechanism shown at the bottom of Fig. 2, on a larger scale; Fig. 4 is a view similar to a portion of Fig. 1. omitting some of the parts, but including the tabulating devices; Figs. 5 and 6 are detail sections on lines 5—5 and 6—6 of Fig. 4; Fig. 7 is a detail plan view of the resetting mechanism; Fig. 8 represents a section on line 8—8 of Figs. 1 and 2, illustrating the members of the selecting mechanism; Fig. 9 is an elevation of the upper portion of Fig. 8, looking from the right; Fig. 10 is a detail top plan view of the locking mechanism for the selector; Fig. 11 is a bottom plan view of a portion of Fig. 10; Fig. 12 is a detail elevation on line 12—12 of Fig. 10; Fig. 13 is a detail elevation and part section on line 13—13 of Fig. 10; Fig. 14 is a detail section on line 14—14 of Fig. 1; Fig. 15 is a detail plan view, partly in section, of portions of the counter actuating devices; Fig. 16 is a detail plan view, partly broken out or in section, of one of the counter actuating rack bars; Fig. 17 is a detail front elevation, partly broken out, or in section, of the counting mechanism; Fig. 18 is a detail elevation, partly broken out or in section, looking from the right in Fig. 17; Fig. 19 represents a detail section on line 19—19 of Fig. 1, a portion of a key lever of a typewriting machine being also shown; Fig. 20 represents a section on line 20—20 of Fig. 1; Fig. 21 represents a detail section on line 21—21 of Fig. 1; Figs. 22 and 23 are detail elevations which together illustrate the resetting mechanism, Fig. 23 indicating a continuation of Fig. 22 to the right of the latter; Fig. 24 represents a section on line 24—24 of Fig. 22. Figs. 15 to 24 inclusive are on an enlarged scale.

Similar reference characters indicate the same or similar parts in all of the views.

The embodiment of the invention illustrated in the drawings is designed for operation in connection with one of the standard models of typewriting machines, such as that known as the "L. C. Smith." It is to be understood, however, that the invention is equally as well adaptable for use in connection with other typewriting machines. As the only connection between the typewriting machine and the calculating machine is that which results from merely setting the former upon the latter, or in other words, providing the calculating machine as an understructure or sub-base on which the frame of the typewriting machine is removably supported, it is deemed unnecessary to illustrate herein any portion of a typewriting machine further than to show in Fig. 19 what the relative positions of the numeral levers of the typewriting machine would be relatively to the parts of the calculating machine, the actuation of which is controlled by said numeral key levers. A suitable base plate, which may be more or less skeleton for the sake of lightness, is indicated at 30. To avoid complexity of illustration the drawings indicate such base as a solid or continuous plate.

The circular indicating disks of the machine are illustrated at 31 in Figs. 1 and 2, said disks being provided with numerals from one to naught, adapted to show successively through openings provided in a cover plate not shown, but which may be of the character illustrated and described in our application hereinbefore referred to. In some respects the mechanism for rotating the disks is similar to the structure of said application, but instead of rotating the disks by means of rack arms which during their first movement are out of actuating engagement with pinions, we now employ racks and pinions which are in constant mesh, with clutch devices to rotate the indicating disks intermittently in but one direction. As best shown in Figs. 16, 17 and 18, each indicating disk 31 is carried by, so as to rotate with, a spindle 32 mounted to rotate on a fixed pin 33 rising from the base 30. The spindle 32 is provided with a vertically elongated ratchet pinion 34. The spindle 32 and its ratchet pinion 34 are supported upon a disk 35 having a spur pinion 36, said disk and pinion being mounted to oscillate on the fixed pin 33, oscillation being effected by means of an actuating bar having its front end formed with teeth to constitute a rack meshing with the spur pinion 36. By a mechanism presently described each actuating bar 37 is reciprocated to a greater or less extent according to the amount that is to be added or subtracted. The disk 35 carries a pawl 38 held by means of a spring 39 in engagement with the lower end of the ratchet pinion 34. Suitable guides are provided to keep the rack ends of the bars 37 in engagement with the pinion 36. Each ratchet pinion 34 is engaged by a detent 40 suitably mounted as by means of a post 41, a spring 42 (Fig. 18) being employed to preserve the engagement of the detent with the ratchet pinion to prevent retrograde movement of the pinion and indicating disk 31. To prevent over-motion of the ratchet pinion 34 and its indicating disk 31, we provide a lock mechanism comprising a light bar 43 pivoted at 44 to the actuating bar 37 and having a blunt tooth 45 and having its outer forward end beveled or inclined as at 46 adapted to co-act with a pin 47 supported by a part of the carrying mechanism hereinafter described. The lock bar 43 is held in its normal position by a light spring 48 secured at one end as by a screw 49 to one side of the bar 37 and having its free end extending upwardly, the tip 50 of said free end bearing against the side of the lock bar 43. To facilitate an understanding of the operation of this portion of the machine it is to be understood that the actuating bars are normally in the positions indicated in Figs. 15 and 16, that when a numeral key lever of the typewriter is depressed the selected actuating bar is moved rearwardly or in the direction of the arrow in Fig. 16, and that when the actuating bar is returned by the power mechanism hereinafter described said actuating bar reassumes the position shown in Figs. 15 and 16 and stops at a point with the blunt tooth 45 engaging the space between two teeth of the ratchet pinion 34, thus preventing over-motion of the latter by momentum. As the actuating bar 37 moves in a direction the reverse of the arrow in Fig. 16 during the movement of actuating the indicating or counting disk, the beveled end 46 of the lock bar 43 engages the pin 47 so as to hold said lock bar with its tooth 45 firmly engaging the ratchet pinion. When the next movement of said bar 37 occurs in the direction of the arrow in Fig. 16 said beveled end 46 leaves the pin 47 and the tooth 45 leaves the ratchet pinion, but the latter cannot rotate backwardly because of the detent 40. As shown in Fig. 18, the lock bar 43 is sustained at a suitable elevation above the bar 37 so as to engage the ratchet pinion 34 above the pawl 38, as by means of a block 51 interposed between said bars 37 and 43.

In order to carry tens from one indicator to the indicator next to the left of that in actuation, we provide a series of short flat bars 52 pivotally mounted upon posts 53 rising from the base 30. Each bar 52 carries at its left-hand end an arm 54 pivoted at 54$^c$, said arm 54 extending backward slightly beyond the ratchet pinion at the left, and said bar 52 carries at its right-hand end an arm 55 pivoted at 56 and terminating a little short of the periphery of the ratchet pinion at its right. Stop pins 58 set in the base limit forward motion of the ends of bars 52 which carry the arms 54. The rear end of arm 54 is given the form of a ratchet tooth 54$^d$ positioned to enter the teeth of the ratchet pinion next adjacent to the left, while the arm 55 has a notch 60 cut from its rear end to engage a pin 59 fixed in the base plate. Both arms 54, 55 are caused to find their operative position by force of a spring 57 coiled around the post 53 and suitably engaged at its ends with said arms. Each vertical ratchet pinion 34 carries affixed to its upper part a radially projecting tooth 63 so situated that once in each rotation of said pinion, this projecting tooth will contact with the pivotally mounted arm 55, rocking it out of connection with restraining pin 59 and permitting a spring 61, which is attached to the bar 52 at slight tension, to swing said bar and move the arm 54 a sufficient distance to rotate the ratchet pinion 34 adjacent at the left, with which it is engaged, one tooth, thereby carrying one ten to the indicator of next higher denomination. The rear ends of the springs 61 are suitably fastened to the base plate as at 62.

As indicated in Fig. 17, the pin 47 hereinbefore described is a downwardly extending portion of the pivot pin 54$^c$. When the bar 52 is moved to carry onto the next indicator, the pin 47 is thrown forward and out of contact with the beveled tip 46 of lock bar 43, thereby instantly releasing the lock and permitting the ratchet pinion to be rotated to bring the numeral of the next higher value to the view point. The right-hand edge of arm 54 is provided with a wedge-shaped projection or cam surface 54$^a$, commencing nearly opposite its single ratchet tooth and inclined toward the right in approaching the rear end of said arm. When the arm 54 is in its rear position, ready for carrying, the cam surface 54$^a$ is just out of contact with an abutment pin 54$^b$, but upon forward motion of the arm 54 to rotate a ratchet pinion one tooth this cam edge 54$^a$ contacting with abutment 54$^b$ deflects the rear end of arm 54 toward its ratchet pinion, thereby pressing the point of the ratchet tooth firmly against the pinion and locking it against any greater motion than the one-tenth of a revolution desired.

To positively limit the extent to which the bars 37 may move forwardly we provide means such as stop pins 64 (Fig. 15) rising from the base. The actuating bars 37 reciprocate between suitable front guides indicated at 65 in Fig. 18, and rear guides indicated at 66 in Fig. 19. Said two Figs. 18 and 19, although on slightly different scales, are to be referred to together to indicate nearly a complete section from front to rear of the machine. Each bar 37 is provided with an upwardly projecting pin 67, which is engaged by a mechanism presently described when said bar is to be pushed backwardly or in the direction of the arrow, Fig. 16. Each pin 67 is in the path of rearward movement of a slide 68 mounted in a casing 69 of the selector mechanism hereinafter described. Each slide 68 is formed or provided with front and rear depending lugs 70 and 71 respectively for a purpose hereinafter described.

Before describing the means which determines which one of the slides 68 shall be selected for reciprocation, we will describe the compound carriage mechanism through which power is transmitted to reciprocate the selected slide and its counter actuating bar 37. Referring to Figs. 4 and 19, the compound carriage consists of upper and lower members 72, 73, slidably mounted in supports 74, each of said members having openings formed therein to reduce the weight thereof and to permit the passage through such opening of members of the resetting mechanism hereinafter described. The rear bar of the upper member 72 is formed or provided with a plurality of downwardly depending lugs 75 which are spaced uniformly in accordance with the lateral spacing of the actuating bars 37. The member 72 has a rearwardly projecting ledge 76 for a purpose hereinafter described, and at its ends is provided with outwardly projecting pins 77 which enter slots 78 in the lower ends of arms 79 secured to a rock-shaft 80. The purpose of the shaft 80 and its arms 79 connected as described to the member 72 is to equalize the reciprocating movements of said member 72, or in other words, to render it certain that both ends of said member will reciprocate in exact unison. The lower member 73 of the carriage has rearwardly extending arms 81, the rear ends of which arms have posts 82 connected by springs 83 with posts or lugs depending from the upper member 72 of the carriage. The compound carriage is reciprocated by mechanism presently described, the construction of this carriage in two parts as mentioned enabling the lower member to travel always a uniform distance while the upper member is so yieldingly connected to it through the springs 83 as to enable said upper member to be stopped at a point of its rearward movement determined by the control mechanism hereinafter described, or in other words, according to the amount of movement that is to be imparted to an actuating bar 37 to count a greater or lesser number. Secured to the upper face of the lower member 73 of the carriage is a strip of suitable light material, such as wood, having a strip of felt along its front face to serve as a buffer when the two members of the carriage, after having been spread from their normal relationship are returned to the positions shown in Fig. 19. The ends of the lower member 73 are provided with ears 86 which are connected by links 87 with arms 88 of a rock-shaft 89 mounted in bearings provided by the uprights 74, the construction being such that whenever the rock-shaft 89 is actuated by the power mechanism hereinafter described said rock-shaft acts through the links 87 to impart a single reciprocation to the lower member 73 of the compound carriage so that the latter, through the springs 83, imparts a yielding reciprocation to the upper member of the carriage.

A bar 90, which for convenience of description will be hereinafter referred to as the bail, is carried by two arms or levers 91 pivoted at 92 to the member 72 of the carriage, said arms 91 extending rearwardly above the ends of springs 93, which are attached to said member 72, the force of these springs being exerted upwardly under the rear ends of the arms 91 so as to yieldingly depress the bail 90 and hold the latter normally in position to contact with the upper end of the pivot pin 44, the pin 44 therefore serving as an abutment for the bail 90. The object of the yielding support for the bail 90 is to enable it to be raised above the plane of the tops of the abutments 44 during the resetting to zero, as hereinafter described. It should be explained at this point that the first motion which an actuating bar 37 has is a rearward one, and this is effected by the rearward motion of the carriage, one of the lugs 75 contacting with the front end of a slide 68, the rear end of the latter contacting with the pin 67 of the selected actuating bar 37, the return motion of said bar 37 toward the front of the machine, during which time rotation is imparted to the counter or indicating disk, being effected by the bail 90 acting upon the abutment 44, said bail being brought forward by the compound carriage, which in turn has motion imparted to it by the power mechanism which we will now proceed to describe, referring particularly to Figs. 1 and 20.

A short shaft 94 is mounted in suitable bearings, said shaft having a crank pin 95 projecting from a disk secured to the inner end thereof, said pin being connected by a link 95ª to an arm 96 of rock-shaft 89. On the shaft 94 is mounted a clutch driving mechanism, which may be of the well-known type known as the "Horton" clutch, which is adapted to impart but a single rotation to the shaft on which it is mounted. Said clutch includes a pulley 97 for a belt constantly driven by any suitable power. Said clutch mechanism also includes a stop shoulder 98 which is engaged by a lug or hook at the end of a lever 99 pivoted at 100 and having a lug 101 on one side, the lever 99 being normally held upwardly by a spring 102. A pawl 103 has a shoulder 104 adapted to engage the lug 101, as presently described, and is formed with an inclined edge or cam surface 105, with which latter a fixed pin 106 co-acts, as presently described. A spring 107 connected to the pawl 103 and to a suitable fixed point acts to move or hold the pawl toward the right in Fig. 20. The pawl 103 is pivotally connected to an arm 108 of a rock-shaft 109 mounted at its ends in bearings provided in suitable upright portions of the frame, as seen by comparing Figs. 1 and 2, a coil spring 110 (Fig. 2) serving to normally hold the rock-shaft 109 in the position shown in Fig. 20, with a rearwardly extending portion of the arm 108 in contact with a suitable stop 111. The rock-shaft 109 has secured thereto a series of arms 112, the outer ends of which are preferably bent at an angle to be engaged by the lower edges of the numeral keys levers of the typewriting machine so that whenever a numeral key lever is depressed an arm 112 will be oscillated so as to rock the shaft 109, thus transmitting motion through arm 108 to pawl 103, depressing the latter so that its shoulder 104 will act upon the lug 101 of let-off lever 99 so that the latter will release the lug 98 of the clutch mechanism and permit the power to impart a single rotation to the shaft 94, the latter then imparting, through the link 95 and the shaft 89, a complete reciprocatory motion to the compound carriage. In Fig. 20 the shoulder 104 of the pawl 103 is not shown in position to engage lug 101. This is because in said figure we illustrate the operation of a device for holding the pawl 103 out of operative position. Before describing this mechanism we will explain that normally the shoulder 104 would be just above the lug 101. Then when the pawl descends in the manner just described, the first action is to depress lever 99 as mentioned, but immediately thereafter the cam 105 engages pin 106 so that the pawl 103 is pushed to the left against the action of spring 107 so as to instantly release lever 99 and permit it to be returned to the position shown in Fig. 20 by its spring 102 to stop the clutch so that when the lug 98 of the clutch mechanism has made a single revolution in the direction of the arrow in said figure it will be stopped by the hook of lever 99. In Fig. 20 the device which is shown as holding the pawl 103 out of position to engage lug 101 comprises a spring retracted rod 113 passing through a bearing 114 and having its rear end connected to an arm 115 pivotally supported at 116 and having an anti-friction roll 117 which is actuated by a cam 118 carried by the transverse reciprocating rod 119 of the selector mechanism hereinafter described. This mechanism, as will be explained, provides for intermittent throwing of the power mechanism out of connection. It is sometimes desirable to permanently disconnect the power mechanism, to enable the manually movable numeral key levers 131 (Fig. 19) presently described to be operated without causing the power mechanism to operate. For this purpose we provide a small rod 120 mounted in a bearing 121 and having a hooked end 122 passing behind the pawl 103. The front end of the rod 120 is connected to a finger lever 123 pivoted at 124 and having a spring 125 so connected as to exert friction that will hold the lever 123 in its outermost position toward the left in Fig. 20 to cause the hook 122 to retain pawl 103 in the position shown in that figure against the action of spring 107, so that when depression of an arm 112 causes pawl 103 to descend, it will not engage lug 101 and therefore the power will be left inoperative.

In Fig. 15 the dotted line representation of one of the bars 52 indicates the position to which that bar is moved by the act of carrying from one counter to the other. It is essential, of course, that each of the bars 52 shall be returned or reset to the full line position. To effect this resetting we provide the following mechanism. Each pivot 54ᶜ enters an eye 126 of a link 127 (Figs. 7, 15 and 19) and each of the links 127 is slotted at its rear end, as indicated at 128, the slots receiving pins 129 rising from the strip 84. Since said strip 84 reciprocates of course with the compound carriage, whenever the carriage approaches its rearward position its pins 129, coacting with the rear ends of the slots 128 of links 127, will cause the links to reset any or all of the bars 52 that require resetting. The reason for the lost motion connection provided by the slots 128 is that the extent of movement of the reciprocating carriage is very much in excess of the amount of movement required to shift a bar 52 from the dotted line position shown in Fig. 15 to the normal or full line position.

As has been mentioned, the apparatus is designed to support a typewriting machine without any positive mechanical connection. Such support may be afforded by means of any suitable uprights connected with the base 30. Two of the posts or uprights for supporting the frame of the typewriting carriage are indicated at 130 in Figs. 1 and 2. In practice two more suitable supports or posts will be provided nearer the front of the base. The four supports will in practice be relatively arranged to receive the usual four feet of a typewriting machine. The said posts or supports are so positioned that when the typewriting machine is placed thereon the numeral key levers will occupy substantially the position shown at 131 in Fig. 19. A cross-bar 132 has connected thereto a series of spring arms 133 (Figs. 1 and 19) extending rearwardly above shaft 80 and out of contact therewith and under the front ends of the numeral key levers 131 so that whenever a numeral key lever is depressed it will depress a spring arm 133. It should be understood here that immediately after a key lever 131 has started to depress a spring arm 133, another portion of such key lever farther to the rear engages one of the arms 112 of rock-shaft 109 (Fig. 20) so as to let the power impart a reciprocation to the carriage as has been described. Each spring arm 133 is provided with three holes through which three wires 134 (Figs. 1 and 19) pass loosely, the upper ends of said wires being hooked or bent above the arms 133. The lower ends of the three wires 134 are pivotally connected to three stop levers 135, 136, 137 pivoted upon a cross-rod 138. The three stop levers of each group differ from each other because one is for use in addition, and the other two are used when subtraction is to be effected, as hereinafter explained. The difference between the three levers of each group is indicated by the notching thereof, shown in Fig. 19; that is, the lever 135 is notched backwardly to a greater extent than the lever 136, while the lever 137 is not notched at all. This description applies however to the group illustrated in Fig. 19 designed for use in connection with the nine numeral key. As explained hereinafter, there will be a different notching in each of the three groups. We will now describe the mechanism which prevents the lowering of but one of the stop levers at a time. A cross-bar 139 is mounted so as to be shifted in the direction of its length and has one end pivotally connected as at 140 (Fig. 2) to a lever 141 pivoted at 142 and actuated by mechanism which will be hereinafter described which provides an adjustment to determine whether the machine shall be used for addition or subtraction. As shown in Fig. 19, the bar 139 has secured to its under side a notched strip 143, the projections of which extend under the toes or tips of levers 135, 136, 137. The notches in the strip are of width to permit but one lever of each group of three to drop. When the machine is set for addition the cross-bar 139 and its notched strip 143 are in such a position that the notches will permit only the levers 135 to be lowered. When a numeral key lever 131 is depressed it flexes the spring arm 133 that is underneath it so that the wire 134 which is connected to the stop lever 135 is permitted to descend, the end of spring arm 133 sliding down along the other two wires which are connected to the detained stop levers 136, 137. The uppermost positions of the stop levers is determined by a cross-stop bar 144, which may have an under facing of suitable material such as a strip of leather or felt. The stop lever 135 which is freed descends by gravity until its extreme tip rests upon the surface at the rear edge of the upper member 72 of the carriage. As shown by the dotted line in Fig. 19, the lever 135 is cut away or notched to a considerable extent. This is in order to permit the carriage member 72 to move rearwardly to a distance so that when it is then returned forwardly it will actuate the counter disk for the column selected, to advance sufficiently to indicate the addition of nine, either on one disk or by carrying over to the next disk. It is to be understood at this point that the lever 135 which is to be permitted to drop by the depression of another numeral key lever is cut away or notched backwardly to a lesser extent than indicated by the dotted lines in Fig. 19; for instance, if it is the stop lever which is lowered by the number one key lever the cutting away or recessing would be to a very slight extent. From this it will be understood that the stop levers mentioned determine the position to which the upper carriage member 72 can be moved rearwardly so that on the succeeding forward movement the proper amount of counting or addition will be determined. The rearward end of the notching or cutting away of the stop levers 135 and 136 are undercut to allow the rear ledge 76 to prevent the stop levers from rising under the influence of the contact of the carriage member when it strikes the stop levers.

To prevent rebounding or forward movement of the upper carriage member 72 owing to the contact with the stop levers just mentioned, we provide detent mechanism which is illustrated in Figs. 1 and 21. Secured to the carriage member 72 at substantially the middle thereof is a ratchet rack 145 with which a tooth 146 of an arm 147 co-acts, as presently described. The arm 147 is pivoted at 148 to a bracket 149 and is normally held in the position shown in Fig. 21 by a spring 150. The rear end 151 of the arm 147 extends upwardly to a position to be acted upon by a tappet 152 secured to rock-shaft 89 so that when the rock-shaft oscillates, as hereinbefore described, the said tappet 152, moving from the position shown by full lines in Fig. 21 to a position slightly below that indicated by dotted lines in said figure, will act to lift the tooth 146 from the ratchet rack 145. The outer end of the arm 147 is adapted to be engaged by a hook pawl 153 mounted to oscillate on rock-shaft 80, a spring 154 being connected to said shaft and hook pawl to swing said pawl in the direction of the arrow. The instant that the arm 147 is raised its outer end is engaged by the hook pawl and the tooth 146 is kept out of engagement with the ratchet rack until the rock-shaft 80 oscillates in a direction to cause a pin 155 of said shaft to engage a pin 156 projecting laterally from the pawl and swing the hook pawl toward the left in Fig. 21 so as to release the arm 147, leaving the latter then in position to engage any tooth of the ratchet rack when the latter is shifted rearwardly, or toward the right in Fig. 21. The timing of the operations of the tappet 152 and of the rock-shaft 80 is such that the arm 147 is raised at the instant when the compound carriage reaches its extreme position rearwardly, the pawl 153 releasing the arm 147 so as to permit the latter to descend when the carriage reaches its extreme forward position.

It is essential, of course, that any of the slides 68 which may be accidentally moved in the direction of their length by any jarring action or friction of the carriage shall be accurately returned to proper position so that proper selection may take place. To effect this, the lower carriage member 73 is provided at its rear edge with an upwardly projecting rib 157 engaging behind the front lugs 70 of the slides 68. Inasmuch as the carriage member 73 always reciprocates a fixed distance, its rib 157, although free to move away from the lugs 70 toward the right in Fig. 19, must, when the carriage returns toward the front of the machine or the left in Fig. 19, return all slides 68 that may have been shifted toward the right, back to normal position.

To prevent accidental longitudinal movement of the cross-bar 139 so as to shift the notched strip 143 unintentionally, we provide an automatic lock for said bar 139, as shown in Fig. 14. The bar 139 near one end has three recesses side by side, as shown in Fig. 1, which are spaced in accordance with the spacing of the three stop levers 135, 136, 137 of a group. A lock arm 158 is pivotally connected to an arm 159 rigidly connected to shaft 109. The end of the lock arm 158 is beveled at 160 and rides upon a pin 161, said lock arm passing through a guide 162 located and formed to prevent the lock arm from having any lateral movement, although it may move vertically, as shown in full and dotted lines in Fig. 14. When the numeral key lever is depressed so that it engages an arm 112 (Fig. 20) and rocks the shaft 109, the lock arm 158 is drawn rearwardly, its inclined end riding down over the pin 161 until the lower edge of said arm drops into a recess or notch of the bar 139, thus locking the latter and preventing any accidental shifting of it during the depression of a key. Of course if the bar 139 were to be shifted while a key was depressed, then the stop lever which had been lowered would be liable to have its tip caught under the strip 143. This might then permit another stop lever of that group to drop through the notch.

We will now describe the selector mechanism in detail, referring to Figs. 1, 2, 4, 7 and 19. The selector slides 68 are mounted, as has been explained, in a casing 69. Said casing is in two sections, each of which is movable intermittently and laterally, independently of the other. To support these sections so that they may be shifted laterally of the machine we provide tracks or ways 163 (Fig. 19) mounted upon suitable supports such as posts 164 in order that space may be provided below the sectional casing for the actuating bars 37. Strips 165 underneath the sectional casing have end lugs projecting under the tracks 163 to prevent the casing from rising, the said tracks, of course, also guiding the casing sections during their lateral adjustment by the mechanism hereinafter described. Rising from the base of the machine at substantially the mid-width thereof is a post or bracket 166, the sections of the casing being at opposite sides thereof. The two casings are connected together by a spring 167 having a tendency to draw both sections toward the opposite sides of the post 166. A lever 168 pivoted at 169 has a roll 170 at its front end entering the space between the two sections of the casing 69 behind the post 166. This lever is actuated by a mechanism hereinafter described so as to control the positions of the casing sections, as hereinafter described. The slides 68 are mounted in the casing sections, with such relative spacing that only one of said slides at a time can be located behind or in the path of one of the lugs 75, said relative arrangement of the slides 68 constituting a vernier-like arrangement for a purpose presently explained. As the carriage of the typewriting machine travels toward the left, the lever 168 is shifted step by step from the position shown in Fig. 4 by means of connections to be described. The first movement of the roll 170 toward the right will permit the spring 167 to cause the left-hand casing section to move toward the right to bring one of the slides 68 in position behind the first lug 75 at the left in Fig. 4 so that the rearward movement of the compound carriage will cause the said first slide 68 at the left to move rearwardly and slide the actuating bar 37 back to an extent determined by the control mechanism hereinbefore described. A further movement of the lever 168 will cause a shifting along of the left-hand casing 69 to bring the next slide 68 in line with the next lug 75, and so on. The first series of stop movements of the lever 168 causes one traverse or sliding movement of the left hand casing 69 under the tension of spring 167 until the roll 170 of the lever contacts with the inner end of the right-hand casing section 69, further step movements of the lever 168 then intermittently moving said right-hand section against the tension of spring 169, the left-hand casing section coming to rest against post 166. During this gradual step movement of the casing sections all of the vernier-like positions of the slides 68 have brought each one of said slides successively into position to act as a temporary connection between the compound carriage and an actuating bar 37.

The reason for making the selector casing in two sections is because the amount of movement that would be required if made in one section or piece would cause the slides 68 to be shifted along to such positions that two of the slides might be brought to connecting positions simultaneously unless the slides 68 and lugs 75 were made prohibitively thin or narrow.

The lever 168 which shifts the selector sections has a pin 171 at its rear end which is engaged by mechanism including a coupler that is connected with a portion of the carriage of the typewriting machine during a portion of the travel of said carriage. For this latter purpose we provide a laterally shiftable frame comprising the bar 119 mounted to travel between upper and lower rolls 173 supported by brackets 174 rising from the base 30. Arms 175 rigidly connected to the bar 119 and extending rearwardly therefrom carry a plate 176 which travels between upper and lower rolls 177 carried by a bracket 178 rising from the base 30. Rigidly secured to and rising from one end of the bar 119 is an upright 179 which carries the coupler presently described. The chief purpose of the plate 176 is to guide the bar 119 so that the upright 179 will be held always in vertical position, while permitting it to be shifted laterally or in the direction of movement of the typewriter carriage. To additionally support the upright 179 when it is shifted toward the left we provide a roll 180 mounted to ride upon the base 30 or a lateral extension of the latter. A further purpose of the plate 176 is to carry the latch mechanism which engages the lever 168, the mounting of the said latch mechanism on the said plate enabling us to provide a longer lever 168 than if such latch mechanism were to be carried by the bar 119.

Referring particularly to Figs. 10 and 11, the latter being an under plan view of the plate 176 and the latch mechanism, a lug 181 is fixedly secured to the plate 176 in position to contact with the left side of the pin 171 of lever 168. A latch 182 is pivoted to 183 and has a cam surface 184 adapted to contact with a fixed pin 185 rising from the base. The latch is normally held in the position shown in Figs. 10 and 11 by a spring 186. The free end of the latch is formed with a shoulder 187 and with a vertical lug 188.

Mounted in the upper end of the upright 179 is a rock-shaft 189 (Figs. 2, 8 and 9) having a coupling member comprising an off-set arm 190 extending tangentially to the rock-shaft, the said arm 190 being beveled or inclined similar to a latch. The shaft is formed with a key-way 191 which receives a pin projecting inwardly from a collar 192 having an arm 193, said collar being mounted in a slot or recess in the upright. The arm 193 is connected by a link 194 with a lever 195 pivoted at 196 to the base of the upright. A spring 197 engaging the under side of the arm 193 normally holds the rock-shaft and its latch or coupler arm 190 in normal position, such position being determined by a stop 198 projecting from the upright above the lever 195. Said lever 195 is formed with a cam surface 199 adapted to engage a fixed pin 200 projecting rearwardly from a side flange rising from the base (Figs. 2 and 8).

The frame of the carriage of a typewriting machine always has some portion which is adapted to have the coupler or latch arm 190 engage therewith, while an extreme end portion of the said typewriter carriage frame may contact with the inner end of the shaft 189 so that when the parts are coupled the upright will partake of movements of the typewriter carriage frame in both directions. In order that the distance of the upright from the typewriter carriage, when coupled, may be varied to enable numerals to be written in different lateral positions on the sheet of paper and at the same time have the calculation operations performed, the rock-shaft 189 may be adjusted longitudinally. For this purpose said shaft is formed with a series of annular grooves 201, either one of which may be engaged by the end of a locking slide 202 having a spring 203 acting to hold said slide with its upper end in one of said annular grooves. The slide is provided with a suitable finger piece 204 to enable it to be disengaged from the rock-shaft to permit the latter to be shifted longitudinally, the spring 203 then returning the lock slide to co-act with another annular groove of said rock-shaft. This portion of the machine operates as follows: At the beginning of use of the machine the upright will occupy the position shown in Figs. 4 and 8, which is its extreme right-hand position, the carriage of the typewriting machine being separated from the coupler and occupying the position which it would have when beginning the writing of a line. The typewriting machine may be used for writing words, such as quantities and character of goods for which a bill is being made out, the parts being adjusted so that when the portion of the bill sheet which is to have the amounts written thereupon has reached a proper position to be filled in, the left-hand end of the typewriter carriage frame rides over the beveled surface of the coupler arm 190 and contacts with the end of shaft 189, said arm 190 then springing up behind that portion of the frame of the typewriter carriage. To facilitate an understanding of this operation a portion of the frame of the typewriter carriage which would be so engaged is indicated in cross section at $a$ in Fig. 8. The spring which causes the typewriter carriage to travel then pushes the upright toward the left and of course causes the bar 119 and plate 176 to travel toward the left. At this time the shoulder 187 (Figs. 10 and 11) is engaged with the right-hand side of pin 171 of the lever 168 so that during step movements of the typewriter carriage and of the upright 179, the lever 168 is caused to impart step movements to the selector mechanism already described. These step movements continue until the cam 184 reaches the fixed pin 185, causing the latch 182 to swing and release the pin 171 of lever 168 so that the typewriter carriage can continue to move toward the left, if desired, without producing any further effect upon the selector mechanism. At the moment of separation of the latch from the selector lever 168 just described, the latter is in the position shown in Fig. 10. To hold it in this position until the typewriter carriage is shifted manually to the right, we provide a detent mechanism illustrated chiefly in Figs. 8, 10, 12 and 13. A block 205 secured to the base 30 has an arm 206 pivoted to it at 207. The arm 206 has secured to it one end of a spring detent 208, the free end of which curves upwardly, as shown in Fig. 12, to normally occupy a position in the path of movement of a small stop pin 209 extending downwardly from the lever 168. The arm 206 also has secured to it a spring arm 210 having a lug 211 at its free end, said lug having a beveled face 212. The arm 206 with its spring detent and spring arm is normally held in the position shown in Fig. 10, against stop pin 213, by a spring 214.

As the lever 168 is being shifted as heretofore described to the position shown in Fig. 10, its stop pin 209 rides along the upwardly curved end of spring 208 and depresses the latter and snaps behind it to the position shown in Fig. 12, said spring 208 being strong enough to hold the lever 168 in that position against the pull of spring 167 (Fig. 4), the right-hand section of the selector casing being then of course held over to the right, the left-hand section of said casing being then in contact with the post 166. This is while the typewriter carriage and the upright 179 are over to the left. When the typewriter carriage is returned toward the right by the operator, the upright 179 is caused to follow that movement, and during such following movement the cam 184 reaches the pin 185 so that the latch 182 is momentarily swung aside on its pivot so as to permit the lug 188 to take a position behind the side of lug 211. At this moment the cam 184 passes the pin 185 so that the spring 186 of the latch will swing the latch and cause its lug 188 to swing the spring arm 210 and with it swing its supporting block and the spring detent 208 so that the tip of the latter is shifted away from its position to oppose movement of the lever 168. When the latch 182 returns to normal position as just described, the shoulder 187 reëngages the right-hand side of pin 171. During further movement of the typewriter carriage and the upright toward the right, the lug 181 of the latch, by its engagement with the pin 171 of lever 168, swings the latter so as to result in the selector casing sections being shifted back to the position shown in Fig. 4. The object of the inclined or beveled face 212 of the spring arm 210 is to enable the lug 188, when passing from the right toward the left, to ride over said inclined face, depressing said spring arm in doing so, the latter then returning to normal position after the lug 188 has passed.

In order that the upright and its supporting carriage may be held in its extreme right-hand position shown in Fig. 4, without liability of being jarred or otherwise displaced after the typewriter carriage has left it, we provide a detent, comprising a roll 215 carried by an arm 216 pivoted to the base and held by a spring 217 in a notch or keeper 218 formed in the inner edge of plate 176.

It is desirable to positively prevent the typewriter carriage from being stepped along during the time that calculating operations are being performed until the moment of the completion of each calculating operation. To effect this we form or provide the bar 119 (Fig. 4) with a ratchet rack 219 with which a pawl 220 coacts. Said pawl is pressed toward the rack by a spring 221. A link 222 connects said pawl with one of the arms 88 (Figs. 2 and 19) of shaft 89. The connection with the arm 88 is by means of a pin 223 engaging a slot in the link to permit of lost motion so that only during the latter portion of the motion of arm 88 toward the left in Fig. 19 will the pawl 220 be disengaged from the ratchet rack. It will now be understood that since the arms 88 of rock-shaft 89 only reach the position shown in Fig. 19 at the completion of each calculating operation, as already described, at all other positions of said arms 88 the pin 223 occupies a position in the slot of link 222 which permits the spring of pawl 220 to keep it in engagement with the ratchet rack 219.

All of the locking bars or levers 52 which have been released and oscillated for carrying must be returned to their normal original position for resetting to zero. We will now proceed to describe the mechanism illustrated for obtaining this result, which is similar to the mechanism for the same purpose described in our application hereinbefore referred to. Mounted in side members of the frame is a shaft 224 having as many pins 225 projecting therefrom as there are bars 52 (Figs. 1, 15, 18 and 23). Each pin 225 is adapted to contact with the upper end of a pivot pin or screw 56 so that when said shaft 224 is rocked all of its pins will engage the pivots 56 of those bars 52 which have been shifted out of normal position and oscillate said bars to positions so that the notches 60 of the arms 55 will engage the fixed pins 59 hereinbefore described, and lock all of the bars 52 in alinement in the positions shown in Fig. 15. The mechanism for actuating the shaft 224 and its pin will be presently described.

We will now describe the mechanism whereby all the counters or indicators may be set to zero in order to prepare the machine for a new piece of work. Referring to Figs. 1, 22 and 24, a short shaft 226 suitably mounted in bearings has fixedly secured to one end thereof a lever 227 which we refer to as the primary resetting lever. Also fixed to said shaft is an arm 228, to which is pivotally connected one end of a link 229. A slot in said link receiving the pin of said arm provides for lost motion. The other end of the link 229 is connected to an arm 230 of a rock-shaft 231 (Figs. 1 and 22). The lower end of the arm 230 is forked to engage a laterally projecting pin 232 carried by a lug 233 rising from a plate 234 which extends across the machine and is adapted to slide rearwardly and forwardly. In order that said plate shall reciprocate or slide as mentioned, its other end is engaged with another arm or rock-shaft 231 similar to the arm 230. The plate 234 has as many downwardly projecting pins 235 as there are actuating bars 37, said pins 235 projecting down in front of lateral pins 236 of said actuating bars, the construction being such that whenever the primary resetting lever 227 is manually operated in a direction the reverse of the arrow in Fig. 22 all of the actuating bars 37 are moved toward the left in said figure. The actuating bars 37 co-act with slides 237 mounted in a casing 238, which latter is mounted to be shifted transversely of the machine in a manner similar to the selector casing 69, excepting that the casing 238 is a single one instead of a sectional casing. The right-hand end of the casing 238 is provided with a cam surface 239 (Fig. 1), a spring 240, connected to the casing at 241 and at the other end to a suitable fixed part of the frame, normally tending to shift and hold said casing toward the right. To shift said casing toward the left we mount a sliding strip 242 (Fig. 22) on the base 30, said strip being guided by screws 243 passing through slots in the strip. The rear end of the strip 242 is beveled as at 244 (Fig. 1) and contacts with the cam surface 239 of casing 238, so that by sliding the strip 242 backwardly it will push the casing 238 toward the left, bringing the slides 237 into alinement with the rear ends of the actuating bars 37. Each slide 237 is normally projected forwardly by a spring 245. To push the slide strip 242 backwardly we provide a pawl 246 pivoted to the arm 228 and having a shoulder 247 and a beveled rear end 248 beyond which is a cam surfaced lug 249 rising from the base. When the pawl 246 moves toward the left in Fig. 22, the beveled end 248 thereof rides over a lug 250 of the slide strip until the shoulder 247 of said pawl engages said lug 248, after which further movement of the pawl in the same direction will cause the slide strip to move rearwardly until the beveled end 248 reaches the cam lug 249 and to which the end of the pawl rides so as to disengage the shoulder 247 from the lug 250. The return or forward movement of the slide strip is effected by a pawl 251, the free end of which is formed similar to the pawl 246 and co-acts with a cam lug and catch lug similar to those provided for said pawl 246 when said pawl 251 is moved toward the right in Fig. 22, which is a direction toward the front of the machine. The pawl 251 is carried by an arm 252 (Fig. 24) which is mounted to rock on the shaft 226, said arm having a hub mounted in a side frame member 30 and having a lever 253 secured to its outer end, which lever is referred to as a secondary resetting lever, the said secondary resetting lever having a finger crossing behind the primary resetting lever 227 so that while the primary resetting lever can be actuated by itself any movement imparted to the secondary resetting lever will carry the primary resetting lever with it.

In order that the secondary resetting lever cannot be operated at a time when it is essential that the primary lever alone shall be operated, said secondary lever is formed or provided with a rearwardly extending lug 254, which is adapted to be engaged and released by a lock 255 rising from the slide strip 242. When the slide strip is in its forward position the lock 255 prevents the secondary lever from being swung forwardly. The levers 227, 253, are held normally in the positions shown in Fig. 22 by springs 256 connected to upwardly projecting portions of the arms which are swung by said levers.

Mounted loosely on a suitably supported stud shaft 257 (Figs. 1 and 23) is an arm 258 having two triggers 259, 260, pivoted on opposite sides of its outer end. The tip of the trigger arm 260, upon its downward movement, acts upon the rear end of an arm 261 projecting rearwardly from the shaft 224, said shaft being held in the normal position shown in Fig. 23 by a suitable spring, which may be connected as described in the application hereinbefore referred to. When the trigger 260 descends, it rocks the shaft 224 to cause the pins 225 to act on the bars 52 in the manner hereinbefore described.

Also mounted loosely on the shaft 257 (Fig. 23) is an arm 262 which has a pin and slot connection 263 with the arm 261 so that when said arm 261 is depressed by the trigger 260, it depresses the arm 262 and raises a ratchet segment 264, which is rigidly connected with or forms a part of the arm 262. A pawl 265 is normally held by a spring in engagement with the teeth of the ratchet segment so as to hold the shaft 224 through the connections described, to prevent the return of said shaft and its ratchet locking pins until the pawl 265 is released. To effect this release the tail of said pawl projects into the path of movement of a lug 267 of slide strip 242.

A shaft 268 (Fig. 23) has an arm 269 having a pin and slot connection 270 with arm 271 of a lever having a ratchet segment 272 with which a pawl 273 co-acts as presently described. The segment 272, in Fig. 23 is behind segment 264, and the two segments are of the same length. The shaft 268 has a series of pins 274, all in one row, which pins 274, when the shaft 268 is rocked anti-clockwise, move down across the left-hand sides of the arms 55 (Fig. 15) to prevent said arms 55 from being swung out of the position shown in said Fig. 15. The pawl 273 (Fig. 23) is pivoted on the same axis as the pawl 265 and is pivotally connected at 275 to a long link 276, the rear end of which has a pin and slot connection with the arm 252, so that whenever the secondary resetting lever 253 is pulled forward to its extreme position, it withdraws the pawl 273 from its ratchet segment so as to allow the shaft 268 to return to normal position under the influence of a suitably connected spring in a manner similar to the structure in the application hereinbefore referred to. When the pawls 265 and 273 are released after having been withdrawn from their ratchet segments they are returned to normal positions by suitable springs, such as indicated at 277.

The arm 258, which carries the triggers 259, 260 has its hub provided with a downwardly extending arm 278 (Fig. 23) to which is pivoted the front end of a long link 279, the other or rear end of which has a pin and slot connection with the arm 228 of the primary resetting lever.

We will now describe the tabulating devices which enable the operator to quickly determine the position of the typewriter carriage according to the first numeral that is to be written and tabulated. It may be stated here that with a machine organized as illustrated, the number of counters provide for adding up to within a cent of ten billions, the position for the carriage when a numeral is to be written in the billion column being at the extreme left.

Referring to Fig. 4, the sliding selector rod 119 is provided with a suitable projection such as a collar 280, which collar is adapted to abut against the side of the rear end of either one of a plurality of slides 281 as the said rod 119 moves toward the left, the stoppage thus effected determining the position of the typewriter carriage. There are twelve of the slides 281 mounted in a suitable frame indicated at 282 in Fig. 5. Each slide is provided at its forward end with a lug 283 which co-acts with the frame to form a stop to limit the rearward movement of the slide. Each slide has at its front end a tripping lug 284 to co-act with a tappet arm 285 depending from and secured to a rock-shaft 286. There are as many tappet arms 285 as there are slides 281. The rock-shaft 186 has secured to it a rearwardly projecting tripping arm 287 in position to operate the usual carriage release mechanism employed in typewriting machines having tabulating devices, such mechanism usually having a rock-shaft provided with an arm. It is such arm of the usual tabulating mechanism of the typewriting machine that is to be lifted by the arm 287 illustrated in Fig. 5. Such arm of the usual tabulating mechanism of an ordinary typewriting machine is indicated at $b$ in Fig. 5.

Extending transversely of the machine, as illustrated in Fig. 4, and above the slides 281, we provide a suitably mounted series of rock-shafts 288, each having an arm 289 forked at its lower end and engaging a pin 290 of a slide 281. There are as many rock-shafts 288 as there are slides 281. Each rock-shaft 288 has also another arm 291 (Figs. 4 and 6), said arm 291 having pivotally connected to its lower end the rear end of a push rod 292 extending nearly to the front of the machine and having a finger-piece 293, a spring 294 being employed to hold the push rod normally forward. When the operator wishes to start the calculating with any particular counter, the proper finger-piece 293 is pushed inwardly so that, through the connections described, the proper slide 281 has its rear end projected into the path of movement of the collar or projection 280 of the rod 119. Incidentally, this movement, owing to the rock-shaft 286, arm 287 and the tabulator arm $b$ shown in Fig. 5, would release the carriage of the typewriting machine and permit it to be stepped by its spring. It will be understood, however, that if no typewriting machine is present, the operation will be the same if it be desired to use the mechanism illlustrated for tabulating. In such case, however, a suitable spring would be applied to the rod 119 to shift it toward the left.

We will now describe the mechanism which enables the machine to be used for subtraction. As has been explained, there is a lever 141 (Fig. 2) connected to a sliding cross-bar 139, which latter carries a notched strip 143, each notch freeing either one of the levers 135, 136, 137 (Figs. 1 and 19) to permit it to drop when released by the depression of the numeral key lever 131, the three levers of each group being differently recessed to permit the compound carriage to move rearwardly to a greater or lesser extent. The mechanism for controlling the position of the lever 141 and bar 139 and its notched strip is best illustrated in Figs. 2 and 3. The lever 141 is normally held for addition in the position shown in Fig. 2, against a stop pin 296, by a spring 295. The front end of the lever 141 is connected to a slide 297 by devices presently described. The slide 297 is mounted in a suitable slideway transverse of the machine near the front thereof, and has a series of notches 298 in its upper edge. Pivotally mounted below the slide 297 are upright stops 299, the pivotal connections being of a friction type that will hold said stops upright until they are positively swung aside. Each stop 299 has a pin 300 extending through the notches 298 of the slide and into the notches 301 in fixed cross-bar 302 so that the amount of swing that can be imparted to the pivoted stops will be limited by the width of the notches 301.

There is a well-known method of subtraction by means of addition, and it will not be necessary to herein refer to said method further than to state that it requires the addition of a 1 to the right-hand column, the prevention of carrying beyond the higher value enumerated, and the reversal of the order of the digits; for instance, if a 6 is to be subtracted, 3 is added; and if a 5 is to subtracted 4 is added, and if a 9 is to be subtracted, there shall be an actuation of a lever which will do no adding but which will actuate the mechanism to print a "9." This method provides for the addition of the complement of 9 (the difference between 9 and the real amount to be subtracted) and the prevention of carrying as stated. The operator can select either one of the pivoted stops 299 and throw it over to the dotted line position indicated in Fig. 3, so that the lower end of said pivoted stop will pass in front of the left-hand end of the bar 52 that is at the right thereof, so that said bar 52 cannot be moved to the dotted line position indicated in Fig. 13. This, owing to the mechanism illustrated in said Fig. 15 and hereinbefore described, will prevent carrying beyond that point. When the operator so swings a pivoted stop the pin 300 thereof shifts the slide 297, and through lever 141 shifts the bar 139 and its notched strip 143 (Figs. 2 and 19) so that the stop lever 135 of each group cannot be depressed, but instead thereof the stop levers 136 of all of the groups are free to be depressed when released by the manual operation of a numeral key lever 131. The stop levers 136 have the relative depths of their notches or recesses so arranged that the amount of movement that can be imparted to the compound carriage, instead of being according to the numeral borne by the numeral key lever, will be the complement of that numeral according to the method of subtraction by means of addition just described.

It should be explained here that when the operator shifts a pivoted stop 299 as just described, it is essential that the slide and the lever 141 and the bar 139 shall be locked against the action of spring 295 as long as subtraction is to be continued. To effect this, we provide the slide with a pin 303 (Fig. 3) which is adapted to be engaged by the shoulder 304 of a detent 305 pivoted at 306 and normally pressed upwardly by a spring 307. In Fig. 3 the parts are in the relative positions which they occupy when addition is to be performed. When subtraction is to be effected by the method described, the pin 303 is moved to the left from the position shown in Fig. 3, the spring 307 then throwing the detent 305 up so that its shoulder will engage and lock said pin.

We will now describe the object of providing the stop levers 137 of the groups hereinbefore mentioned, and the means for bringing those stop levers into operation in place of the levers 135, 136. As shown in Figs. 2 and 3, the front end of the lever 141 has pivoted thereto a finger-piece 308 having a downwardly projecting lug 309 adapted to bear upon the detent 305. The front end of the lever is forked, as at 310, to engage opposite sides of a lug 311 projecting upwardly from the slide 297. After the slide 297 has been shifted as hereinbefore described, to provide for subtraction by the complement of 9, the present mechanism provides for a further operation presently described, which requires a further shifting of the slide 297 toward the left in Fig. 3. When this is to be done the operator presses against the finger-piece 308 toward the left in Fig. 3, so as to impart a further movement of the lever 141 in the direction of the arrow in Fig. 2 so as to shift the bar 139 and its notched strip 143 to free all of the stop levers 137 and permit any one of them, instead of the stop levers 135, 136, to drop when a numeral key lever is depressed. As presently explained this is done only for the depression of one numeral key lever. The operator retains hold of the finger-piece 308 until such numeral key lever has been operated, and then as soon as pressure against the finger-piece 308 is reduced, the spring 295 returns the lever 141 so that the slide 297 will move toward the right again, while the lug 309 is still bearing upon the detent 305 with sufficient pressure to hold the latter down to permit the pin 303 to return to the position shown in Fig. 3.

As has been explained, the stop levers 135, 136 of the different groups are so recessed to permit movements of the compound carriage for operating the indicators according to the numerals of the numeral key levers when addition is to be effected, but according to the complement of those numerals when subtraction is to be effected, the relationship being according to the complement of 9. The stop levers 137 of the groups are so recessed as to provide for the movement of the compound carriage according to the complement of 10 instead of the complement of 9. For instance, if the numeral key 3 were to be depressed and a stop lever 137 free to descend, the amount that would be added would be 7 instead of 3, and if a numeral key 6 were to be depressed the amount of addition would be 4 instead of 6. With this explanation it will be understood that when the finger-piece 308 is operated so as to act through the lever 141 to shift the bar 139 and its notched strip to free all of the stop levers 137, then the depression of any numeral key will result in the addition of a number the complement of 10 of the numeral borne by that key lever. Therefore, when the operator is effecting subtraction by means of addition, he will first adjust the parts to effect the result by means of the complement of 9 until he comes to the last of the numerals that is to be subtracted, and before performing that last operation he will shift the parts so as to free the stop levers 137 so as to subtract by adding the complement of 10 instead of the complement of 9, the result being that it adds simply one more than would be effected when adding by the complement of 9. That last operation might be to typewrite and subtract either in the cents column or in any other column.

In order that there may be no liability of the actuating bars 37 being jarred or otherwise reciprocated out of normal position, each of said bars is provided with a recess 312 (Fig. 1) adapted to be engaged by a roll carried by a spring-pressed arm 313.

In order that the compound carriage may be practically noiseless in its operation as well as light, we construct the parts of said carriage of non-resonant material, such as hard rubber. Such material furthermore is lighter than metal and will not change its shape or condition under hygrometric or temperature changes.

It is to be understood, of course, that during the resetting to zero hereinbefore described, the bail 90 is raised by suitable mechanism not necessary to explain herein.

As shown in Fig. 4, the lugs 75 of the carriage are uniformly or equally spaced apart, but the slides 68, the ends of which are engaged by said lugs, are not uniformly spaced as to each other nor are any two of them spaced the same as the lugs 75. The reason for this is to prevent the actuation of any counter when the casing 69 (or either of its two parts) is in the position that must provide for the decimal point or for the division which is customarily made by means of commas when the amount is greater than 100. As has been explained, the casing 69 is shifted step by step in unison with the carriage of the typewriting machine employed to control the calculating machine. Therefore, the relative spacing of the slides 68 is such that no slide will be in line with a lug 75 when the decimal point or a comma is to be written.

Having now described our invention, we claim:

1. A calculating machine having counters and means for carrying from one to another, lock devices to prevent over-motion of the counters, and means operated by the carrying mechanism to release the lock devices of the counter to which carrying motion is to be imparted.

2. A calculating machine having counters, means for intermittently rotating them, carrying mechanism including a spring-actuated bar having two arms, means coöperating with one arm to hold the rocking bar against movement by its spring and to release it when one counter completes one rotation, means coöperating with the other arm to impart one tenth of a rotation to the next counter, lock devices to prevent over-motion of the counters, and means operated by said rocking bar to release the lock device of the counter to which carrying motion is to be imparted.

3. A calculating machine having counters, means for operating said counters, and a reciprocating actuating carriage extending transversely of said operating means, said carriage comprising two members movable relatively to each other and adapted to contact.

4. A calculating machine having an actuating carriage composed of two members yieldingly connected, means for moving said carriage, counters, and connections for controlling the actuation of individual counters by movements of said carriage.

5. A calculating machine having an actuating carriage composed of two members, means for positively moving one of said members, yielding connections for transmitting movement of the positively moved member to the other member, counters, and connections for controlling the actuation of individual counters by movements of the yieldingly operated carriage member.

6. A calculating machine having an actuating carriage composed of two members yieldingly connected, means for positively moving one of said members, the other member having a series of lugs, slides adapted to be individually located for operation by said lugs, and counters having connections for actuation by said carriage.

7. A calculating machine having an actuating carriage composed of two members yieldingly connected, means for positively moving one of said members, the other member having a series of lugs, slides adapted to be individually located for operation by said lugs, counters, actuating bars for said counters, and a transverse strip adapted to transmit motion from one of the carriage members to said actuating bars.

8. A calculating machine having counters, means including a reciprocating carriage for actuating said counters, and stop devices limiting the movement of the carriage in one direction, said stop devices including a series of groups of detents, the detent of each group being different from each other and independently movable to operative position.

9. A calculating machine having counters, means including a reciprocating carriage for actuating said counters, stop devices for limiting the movement of the carriage in one direction, said stop devices including a series of groups of levers, the levers of each group being different from each other and independently movable to operative position, and manually controllable means for determining which lever of a group shall be permitted to act.

10. A calculating machine having counters, means including a reciprocating carriage for actuating said counters, stop devices for limiting the movement of the carriage in one direction, said stop devices including a series of groups of levers, the levers of each group being different from each other and independently movable to operative position, and manually controllable means for determining which lever of a group shall be permitted to act, said manually controllable means comprising a transversely movable member notched to permit but one lever of a group to assume operative position.

11. A calculating machine having counters, means including a reciprocating carriage for actuating said counters, a series of stop levers for limiting the movement of the carriage in one direction, said stop levers having their ends notched to different distances, and being independently movable to operative position.

12. A calculating machine having counters, means including a reciprocating carriage for actuating said counters, a series of groups of stop levers for limiting the movement of the carriage in one direction, each group including three levers having their portions which co-act with the carriage at different distances from the normal position of such carriage, and manually controllable means for determining which lever of a group shall be permitted to act.

13. A calculating machine having counters, means including a reciprocating carriage for actuating said counters, a series of groups of stop levers for limiting the movement of the carriage in one direction, a spring arm above each group adapted to be manually depressed, and lost motion connections between each of said spring arms and its groups of stop levers.

14. A calculating machine having counters, means including a reciprocating carriage for actuating said counters, a series of groups of stop levers for limiting the movement of the carriage in one direction, a spring arm above each group adapted to be manually depressed, and a wire connected to each stop lever of a group, the three wires of each group having lost motion connections with a spring arm.

15. A calculating machine having counters, means including a reciprocating carriage for actuating said counters, a series of groups of stop levers for limiting the movement of the carriage in one direction, the levers having tips and recesses below said tips, the recesses differing from each other, a transversely movable controlling member notched to permit but one stop lever of each group at a time to pass through, and means for manually permitting the released stop lever to drop to position to limit the movement of the carriage.

16. A calculating machine having an actuating carriage composed of upper and lower members yieldingly connected, means for moving said carriage, counters, connections for controlling the actuation of individual counters by movements of said carriage, and means for preventing rebounding of the upper carriage member.

17. A calculating machine having an actuating carriage composed of upper and lower members yieldingly connected, means for moving said carriage, counters, a series of slides either one of which is adapted to be moved by the upper member of said carriage, connections between said slides and counters for actuating the latter, and means carried by the lower member of the carriage to return back to normal position slides that have been shifted.

18. A calculating machine for operation in connection with a typewriting machine, having a selector mechanism comprising a plurality of laterally shiftable slides independently movable longitudinally, counters, and means for operatively connecting said slides and counters.

19. A calculating machine for operation in connection with a typewriting machine, having a selector mechanism comprising a laterally shiftable two-section casing, slides mounted therein, counters, and means for operatively connecting said slides and counters.

20. A calculating machine for operation in connection with a typewriting machine, having a selector mechanism comprising a laterally shiftable two-section casing, slides mounted therein, a spring connected to the two sections of the casing to draw said sections toward each other, a lever for actuating one section in one direction and the other section in the opposite direction, counters, and means for operatively connecting said slides and counters.

21. A calculating machine for operation in connection with a typewriting machine, having a selector mechanism comprising a plurality of laterally shiftable slides independently movable longitudinally, counters, and means for operatively connecting said slides and counters, said means including a carriage having lugs to engage said selector slides, the spacing of the selector slides differing from the spacing of said lugs.

22. A calculating machine having a shiftable selector mechanism, a laterally movable upright connected therewith, said upright having a coupler, and means for automatically controlling said coupler to cause it to connect with the carriage of a typewriting machine during a portion of the travel of said carriage.

23. A calculating machine having a shiftable selector mechanism, a laterally movable upright connected therewith, said upright having a coupler having connections for controlling said selector mechanism, and means for automatically controlling said coupler to cause it to connect with the carriage of a typewriting machine during a portion of the travel of said carriage toward the left and return.

24. A calculating machine having a shiftable selector mechanism, a laterally movable upright connected therewith, said upright having a coupler, and means for automatically controlling said coupler to cause it to connect with the carriage of a typewriting machine during a portion of the travel of said carriage, means being provided for breaking the connections of the upright and the selector mechanism at an intermediate point of the movement thereof.

25. A calculating machine having a shiftable selector mechanism, a laterally movable upright connected therewith, said upright having a coupler, and means for automatically controlling said coupler to cause it to connect with the carriage of a typewriting machine during a portion of the travel of said carriage, the mechanism being adjustable to affect the operation of the selector mechanism to permit the calculations to be made during either one of different positions of the typewriter carriage.

26. A calculating machine having counters and a transversely movable rod, a selector mechanism including a lever for controlling the connections with individual counters, means for operating said lever by movements of said rod, an upright connected to said rod, and a rock-shaft carried by said upright and having a coupling member adapted to engage a portion of the carriage of a typewriting machine.

27. A calculating machine having counters and a transversely movable rod, a selector mechanism including a lever for controlling the connections with individual counters, means for operating said lever by movements of said rod, an upright connected to said rod, and a rock-shaft carried by said upright and having a coupling member adapted to engage a portion of the carriage of a typewriting machine, said rock-shaft being adjustably connected to the upright.

28. A calculating machine having a shiftable selector mechanism, a lever for shifting said mechanism, means adapted to be shifted by movements of a typewriter carriage to actuate said lever, the connections between said lever and its actuating means being automatically separable, and means for locking said lever in the position in which it is left by its actuating means when the connections are separated.

29. A calculating machine having a shiftable selector mechanism, a lever for shifting said mechanism, means adapted to be shifted by movements of a typewriter carriage to actuate said lever, the connections between said lever and its actuating means being automatically separable, and means for locking said lever in the position in which it is left by its actuating means when the connections are separated, the locking means being displaceable by the return movement of the lever actuating means.

30. A calculating machine having independent counters, selector mechanism for determining which of the counters shall be connected for actuation, said selector mechanism including a transversely movable stop, a series of slides, and manually controllable means for shifting either one of said slides into the path of movement of said stop.

31. A calculating machine having independent counters, selector mechanism for determining which of the counters shall be connected for actuation, said selector mechanism including a transversely movable stop, a series of slides adapted to be individually shifted into the path of movement of said stop, a series of rock-shafts, each rock-shaft having connections to control the position of one of said slides, and means for manually operating said rock-shafts.

32. A calculating machine having spring arms fixed at one end and having their yielding free ends in position to be actuated by numeral key levers of a typewriting machine above said arms, counters, and connections with the outer portions of said spring arms for controlling the operation of the counters by said arms.

33. A calculating machine having counters, means for operating said counters by power, a series of spring arms in position to be actuated by numeral key levers of a typewriting machine above said arms to connect the power mechanism with either of the counters to actuate the latter, and another series of depressible members in position to be actuated by the said numeral key levers to control the extent of operation of the counters.

34. A calculating machine constructed to effect subtraction by means of addition, said mechanism having counters, actuators for said counters, numeral keys to control the actuation of the counters, and shiftable connections to alter the effect of the actuators upon the counters either according to the numerals of said keys, or the complement of 9 or the complement of 10 of those numerals, said connections including a series of groups of differently spaced stop members.

35. A calculating machine having an actuating carriage provided with spaced projections or lugs, means for reciprocating said carriage, slides to be engaged by said projections or lugs, said slides being transversely movable and unequally spaced.

36. A calculating machine having an actuating carriage provided with spaced projections or lugs, means for reciprocating said carriage, a transversely movable two-section casing having unequally spaced slides adapted to be brought individually into position to be engaged by said projections or lugs.

37. A calculating machine having counters, and devices for controlling the actuation of said counters, said controlling devices projecting upwardly to position to be operated by key levers of a typewriting machine, whereby operative relationship exists without positive connection of the calculating machine with the typewriting machine.

In testimony whereof we have affixed our signatures in presence of two witnesses.

EDWARD H. PALMER.
WILLIAM S. KINSLEY.

Witnesses:
A. W. HARRISON,
P. W. PEZZETTI.